United States Patent [19]
Herndon

[11] Patent Number: 4,883,243
[45] Date of Patent: Nov. 28, 1989

[54] EJECTION SEAT HAVING RECEDING HEADREST FOR SPINAL ALIGNMENT DURING EJECTION

[75] Inventor: Gerald F. Herndon, Bellevue, Wash.
[73] Assignee: The Boeing Company, Seattle, Wash.
[21] Appl. No.: 121,531
[22] Filed: Nov. 17, 1987
[51] Int. Cl.[4] .............................................. B64D 25/10
[52] U.S. Cl. ................................ 244/122 R; 297/216; 297/391; 297/409; 244/122 AG
[58] Field of Search ............ 244/122 R, 121, 122 AG, 244/122 A; 297/216, 391, 403, 404, 408–410

[56] References Cited

U.S. PATENT DOCUMENTS

| | | |
|---|---|---|
| 2,920,848 | 1/1960 | Bohlin . |
| 3,170,650 | 2/1965 | Wood, Jr. . |
| 3,525,490 | 8/1970 | Duncan et al. . |
| 3,981,465 | 9/1976 | Sinnett et al. ................... 244/122 A |
| 4,205,878 | 6/1980 | Wooten . |
| 4,278,291 | 7/1981 | Asai ..................................... 297/21 G |
| 4,466,662 | 8/1984 | McDonald et al. . |
| 4,477,041 | 10/1984 | Dunne ......................... 244/122 AG |
| 4,592,523 | 6/1986 | Herndon ...................... 244/122 AG |
| 4,762,367 | 8/1988 | Denton ................................ 297/391 |

FOREIGN PATENT DOCUMENTS

506851 .7/1939 United Kingdom .

OTHER PUBLICATIONS

Popular Science, May 1982, pp. 86–87.

*Primary Examiner*—Galen L. Barefoot
*Attorney, Agent, or Firm*—Seed and Berry

[57] ABSTRACT

An ejection seat includes a rigid shell adapted to closely surround the head of a pilot during ejection to restrain lateral movement of the pilot's head. The pilot's head is supported within the shell during ejection at a position that causes it to be aligned with the pilot's spinal column. During normal flight conditions, the pilot's head is supported in a forwardly pivoted position by a front panel. In this forwardly pivoted position, the pilot's head is free to move about to check for other aircraft. In one embodiment, the front panel slides rearwardly into the shell during ejection. In another embodiment, the front panel is divided into two sections, each of which pivots inwardly into the shell during ejection.

19 Claims, 3 Drawing Sheets

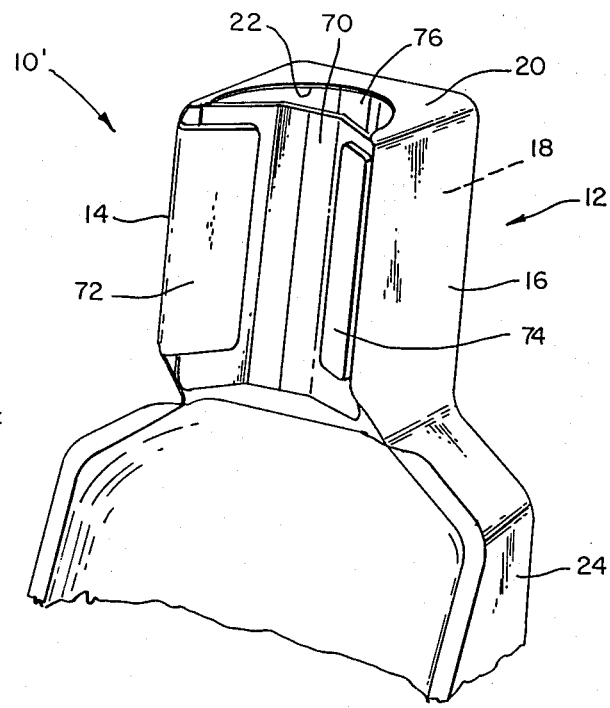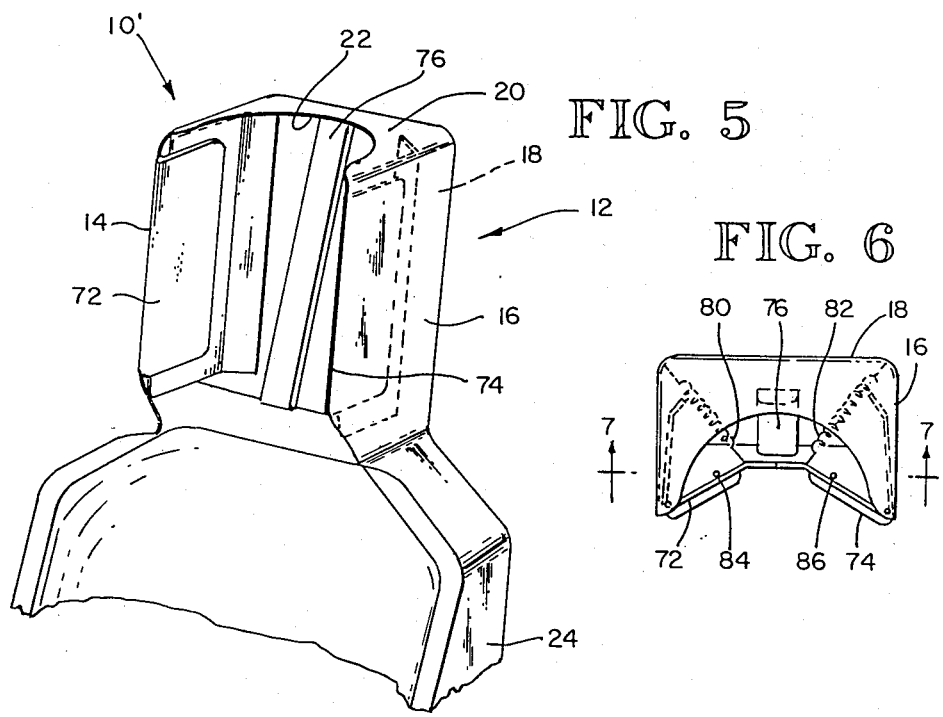

EJECTION SEAT HAVING RECEDING HEADREST FOR SPINAL ALIGNMENT DURING EJECTION

TECHNICAL FIELD

This invention relates to aircraft ejection seats, and more particularly, to an aircraft ejection seat having a headrest that automatically aligns the pilot's head with his spine and restrains the pilot's head against lateral movement during ejection.

BACKGROUND ART

High-performance military aircraft normally have ejection seats that allow a pilot to eject from an aircraft along with his seat in an emergency. Emergencies requiring an ejection can occur at virtually any airspeed. Ejection from a high-performance military aircraft at high speeds imposes a great deal of stress on the pilot, primarily due to the aerodynamic drag on the pilot. In fact, the aerodynamic drag on a pilot ejecting at very high airspeeds can even decapitate the pilot or sever his arms or legs.

In order to control the effects of aerodynamic drag, modern ejection seat technology includes propulsion and stabilization systems which control the angular orientation of the ejection seat as it decelerates. However, these propulsion and stabilization systems create their own adverse stresses on the pilot. More specifically, the propulsion and stabilization systems must act quickly enough to orient the ejection seat before it allows the aerodynamic drag to injure the pilot. Yet rapid changes in the angular orientation of the ejection seat apply rapid roll rates which exert very high lateral loads on the pilot's head.

Injuries to pilots resulting from aerodynamic drag and high lateral forces resulting from modern ejection seat propulsion stabilization systems might be avoided by continuously restraining movement of the pilot's head and limbs while he is flying the aircraft. However, restraining the pilot's head while he is flying a high-performance military aircraft is not practical for a number of reasons. First, it is necessary for the pilot to continuously look around for both hostile and non-hostile aircraft. In fact, the pilot must even periodically check his six o'clock (i.e., rear) position to be sure that an enemy aircraft is not engaging him from behind. Thus, the pilot must be able to freely move his head about. Second, the optimum angle of the head is not the same in both flying and ejecting conditions. When the pilot is flying the airplane, his head should be tilted forward in a comfortable position to place the pilot's head at a prescribed angle in order to permit proper operation of the head-up display in the cockpit. In contrast, during ejection, the head should be aligned with the spinal column so that acceleration of the ejection seat during ejection does not cause the head to be thrown forward. Thus, it is not possible to provide both safe ejection characteristics and optimum flying characteristics by fixing the position of the pilot's head.

DISCLOSURE OF THE INVENTION

It is an object of the invention to provide a movable headrest that automatically positions the resting position of the pilot's head in the optimum position in both normal flying and emergency ejection conditions.

It is another object of the invention to provide an ejection seat headrest to restrain lateral movement of the pilot's head during ejection yet allow the pilot's head to move freely while flying the airplane.

It is still another object of the invention to provide an ejection seat headrest that addresses the problem of excessive stress on a pilot's head caused by aerodynamic drag and lateral acceleration.

These and other objects of the invention are provided by a rigid shell mounted on the ejection seat behind the pilot's head. The shell has a back panel and a pair of side panels extending forwardly therefrom. The side panels are spaced apart by a distance that is slightly larger than the width of the pilot's head. A front panel extends between the forward edges of the side panels and supports the pilot's head at a forwardly tilted angle during normal flying conditions. In the event of an emergency requiring ejection, an actuator moves the front panel rearwardly into the shell to allow the pilot's head to pivot rearwardly between the side panels to an angle at which the pilot's head and spinal column are in alignment with each other. In one embodiment, the front panel slides rearwardly into the shell without changing its angular orientation. In another embodiment, the front panel is divided into two panel sections that pivot inwardly into the shell. In either case, the front panel may be resiliently biased into the shell and held in its forward position by a latching mechanism which, when released, allows the front panel to move rearwardly into the shell.

BRIEF DESCRIPTION OF THE DRAWINGS

FIG. 4 is an isometric view of a second embodiment of the inventive headrest shown in its normal flying position.

FIG. 5 is an isometric view of the second embodiment of the inventive headrest shown in its recessed position for ejection.

FIG. 6 is a top plan view of the second embodiment of the inventive headrest showing the actuating means for moving the front panel into its recessed position for ejection.

BEST MODE FOR CARRYING OUT THE INVENTION

Figure 1:
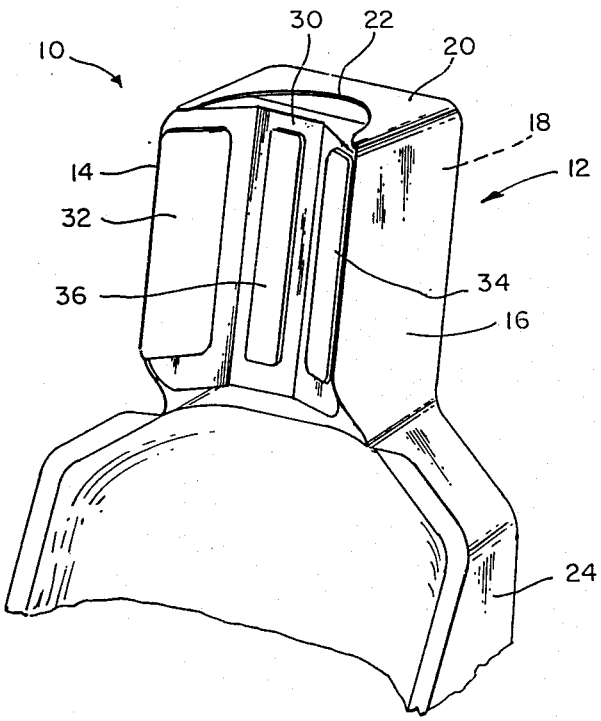
FIG. 1 is an isometric view showing a first embodiment of the inventive headrest in its normal flying position.
Figure 2:
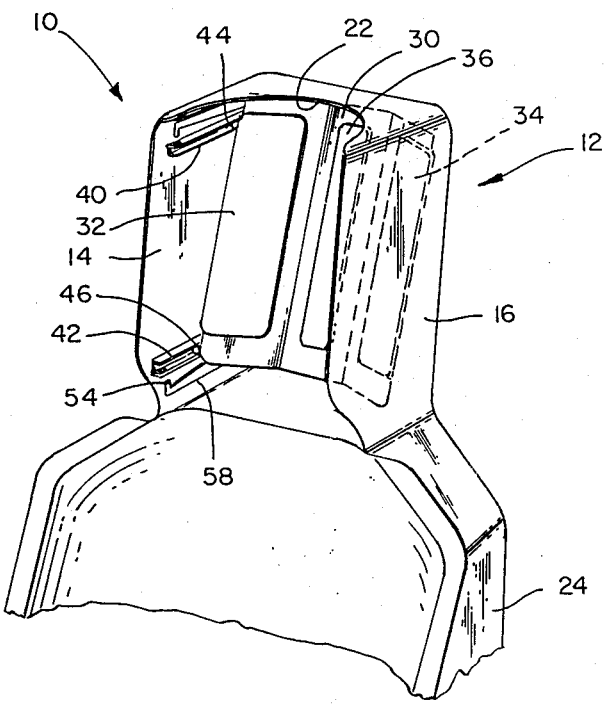
FIG. 2 is an isometric view showing the first embodiment of the inventive headrest in its recessed position for an emergency ejection.

One embodiment of the inventive headrest, as best illustrated in FIGS. 1 and 2, includes a shell 12 having a pair of side panels 14, 16, a back panel 18 extending between the side panels 14, 16, and a top panel 20 having a front-facing semicircular cutout 22. The shell 12 is mounted on the top of an ejection seat 24 of conventional design at a location adapted to be behind the head of the pilot.

As explained in greater detail below, the shell 12 forms a forwardly facing, generally U-shaped cavity which receives the head of the pilot during ejection. The cavity is enclosed during normal flying conditions by a front panel 30 formed by three panel sections 32, 34, 36 that are contoured to the curved shape of the pilot's head. (The term 'head' is intended to encompass not only the pilot's head, but also helmets typically worn by pilots of high-performance military aircraft.) In the normal flying position illustrated in FIG. 1, the front panel 30 supports the pilot's head at an angle that is pivoted forwardly with respect to the spinal column of the pilot. This position is more comfortable and it positions the pilot's head at or near the proper angle for viewing conventional head-up displays. Furthermore, it allows the pilot's head to move freely about to check for other aircraft at all angles, including the six o'clock position.

In the event of an emergency condition requiring ejection, the front panel 30 slides rearwardly into the shell 12 upon actuation of the mechanism that initiates the ejection procedure. The panel 30 may be supported for rearward sliding movement using a number of conventional mechanisms. In the embodiment illustrated, a pair of vertically spaced, longitudinally extending tracks 40, 42 are positioned on each of the side panels 14, 16. A pair of vertically spaced coupling members 44, 46 are mounted on each lateral edge of the front panel 30 and slide in respective tracks 40, 42. In its recessed position, the front panel 30 moves rearwardly to a position that supports the pilot's head at an angle aligning it with the pilot's spinal column. The U-shaped cutout 22 facilitates removal of the pilot's head from the shell 12 during post-ejection pilot/seat separation.

Figure 3:
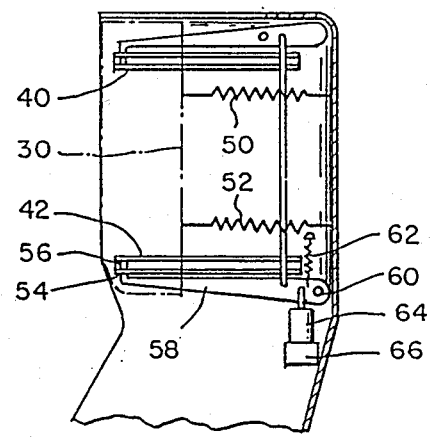
FIG. 3 is a cross-sectional view of the first embodiment showing the actuating means for causing the front panel to move rearwardly into its recessed position.

A variety of actuating mechanisms may be employed to move the front panel 30 rearwardly in the event of ejection. The actuating mechanism is preferably locked in its normal position when no power is applied to the headrest and allowed to move its recessed position when energy is applied to an actuating solenoid. In one embodiment, as illustrated in FIGS. 2 and 3, a pair of vertically spaced tension springs 50, 52 resiliently bias the front panel 30 in a rearward direction. The front panel 30 is held in its forward position by a latching pin 54 that is inserted into a correspondingly sized recess 56 in the front panel 30. The latching pin 54 is formed at the forward end of a lever arm 58 that is pivotally secured to the side panel 14 at 60. The rear end of the lever arm 58 is resiliently biased in an upward position by a tension spring 62.

In normal operation, the front end of the lever arm 58 is held in its upward position by the tension spring 62. In the event of ejection, a solenoid 64 extending between a mounting bracket 66 and the lever arm 58 is energized, thereby pivoting the lever on 58 counterclockwise, as illustrated in FIG. 3. The latching pin 54 is then withdrawn from the recess 56, thereby allowing the springs 50, 52 to pull the front panel 30 inwardly.

A second embodiment of the receding headrest 10' is illustrated in FIGS. 4 and 5. Like the first embodiment 10, the second embodiment 10' includes a shell 12 having a back panel 18, a top panel 20, and two side panels 14, 16 mounted on the top of a conventional ejection seat 24. As in the first embodiment, the second embodiment 10' includes a front panel 70 that supports the pilot's head during normal flying conditions in a position in front of the shell 12. From this position, the pilot's head is pivoted forward slightly to a comfortable position and at an angle that allows optimum use of head-up displays. Further, the pilot can freely move his head to check for other aircraft. Unlike the front panel 30 of the first embodiment 10, the front panel 70 of the second embodiment 10' is divided into two panel sections 72, 74, each of which is pivotally mounted at its outer edges to the respective side panels 14, 16.

In the event of an emergency condition requiring ejection, the front panel sections 72, 74 pivot rearwardly into the shell to allow the pilot's head to pivot rearwardly and rest against a support pad 76. In this position, the pilot's head and spinal column are aligned with each other. Furthermore, the pilot's head is restrained against lateral movement by the surrounding side walls 14, 16.

Figure 7:
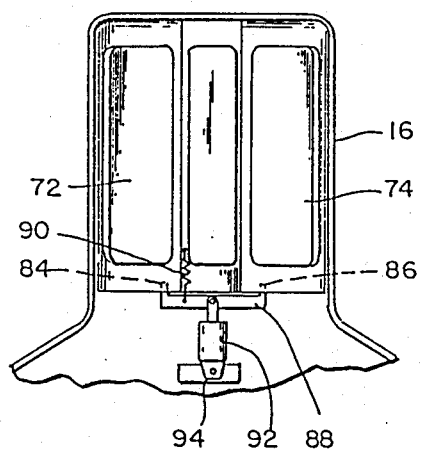
FIG. 7 is a cross-sectional view taken along the lines 7—7 of FIG. 6.

As with the first embodiment, the front panel 70 may be actuated by a variety of mechanisms in the event of an ejection. However, it is preferably that the actuating mechanism be designed so that it locks the headrest in its normal position when power is not being applied to the headrest. As best illustrated in FIGS. 6 and 7, the panel sections 72, 74 are resiliently biased in a rearward direction by respective tension springs 80, 82. The panel sections 72, 74 are latched in the forward position by a pair of latching pins 84, 86 that are positioned behind the panel sections 72, 74, respectively. As best illustrated in FIG. 7, the latching pins 84, 86 are formed at opposite ends of a common actuating arm 88 that is resiliently biased in an upward direction by a tension spring 90. During normal operation, the actuating arm 88 is held in its upper position by the tension spring 90. In the event of an ejection, a solenoid 92 extending between a bracket 94 and the actuating arm 88 is energized, thereby pulling the actuating arm 88 downwardly. The latching pins 84, 86 are then pulled below the level of the panel section 70, 74, thereby allowing the panel sections 72, 74 to be pulled rearwardly by the springs 80, 82.

It is thus seen that the inventive receding headrest for ejection seats automatically positions a pilot's head in the optimum position in both normal flying and emergency ejection conditions. During normal flying conditions, it supports the pilot's head in a comfortable position and at an angle that allows the pilot to view conventional head-up displays. Furthermore, it allows free movement of the pilot's head. In the event of an ejection, the receding headrest positions the pilot's head so that it is in alignment with the spinal column and it restrains the pilot's head against lateral movement. The receding headrest thus addresses the problems of aerodynamic drag, rapid longitudinal deceleration, and lateral acceleration.

I claim:

1. A receding ejection seat headrest comprising:
   a rigid shell mounted on said seat in a position that is adapted to be behind the head of a pilot occupying said seat, said shell having a back panel and a pair of side panels extending forwardly from said back panel, said side panels being spaced apart by a distance that is slightly larger than the width of the pilot's helmet;
   a front panel extending between the forward edges of said side panels, said front panel being in a position that is adapted to support the pilot's head at a forwardly titled angle at a position that is substantially in front of the forward edges of said side panels; and
   actuation means for moving said front panel rearwardly into said shell to allow the pilot's head to move rearwardly between said side panels to an angle at which the pilot's head and spinal column are in alignment with each other and the pilot's head is substantially enclosed by said side panels.

2. A receding ejection seat headrest comprising:
a rigid shell mounted on said seat in a position that is adapted to be behind the head of a pilot occupying said seat, said shell having a back panel and a pair of side panels extending forwardly from said back panel, said side panels being spaced apart by a distance that is slightly larger than the width of the pilot's helmet;
a front panel extending between the forward edges of said side panels, said front panel being in a position that is adapted to support the pilot's head at a forwardly tilted angle; and
actuation means for moving said front panel rearwardly into said shell to allow the pilot's head to move rearwardly between said side panels to an angle at which the pilot's head and spinal column are in alignment with each other, said actuating means including:
(a) mounting means securing the lateral edges of said front panel to respective side panels of said shell in a manner that allows said front panel to slide rearwardly in said shell;
(b) bias means for resiliently biasing said front panel in a rearward direction; and
(c) releasable latching means securing said front panel in its forward position against the rearward force of said bias means and, when released, allowing said bias means to move said front panel rearwardly into said shell to a position that aligns the pilot's head and spinal column when the pilot's head rests against said front panel.

3. The receding ejection seat headrest of claim 2 wherein said mounting means comprise a pair of vertically spaced, longitudinally extending tracks mounted on each of said side panels, and a pair of vertically spaced coupling members mounted on each lateral edge of said front panel and slidably engaged in said track to support said front panel and allow it to move rearwardly.

4. The receding ejection seat headrest of claim 2 wherein said releasable latching means comprise a latching pin extending from said shell and engaging said front panel to prevent said front panel from moving rearwardly, and release means for displacing said latching pin such that it disengages said front panel, thereby allowing the front panel to move rearwardly into said shell.

5. The receding ejection seat headrest of claim 4 wherein said release means includes a solenoid mechanically coupled to said latching pin to disengage said latching pin from said front panel when said solenoid is energized.

6. The receding ejection seat headrest of claim 2 wherein said mounting means maintains the angular orientation of said front panel constant as said front panel is moved rearwardly into said shell.

7. The receding ejection seat headrest of claim 1 wherein said shell further includes an upper panel having a forward facing U-shaped cutout to facilitate withdrawal of the pilot's head from the shell during post-ejection separation of the pilot and the ejection seat.

8. The receding ejection seat headrest of claim 1 wherein said front panel has one of its lateral edges pivotally mounted along the forward edge of one of said side panels so that said front panel pivots on said side panel about an axis that is generally parallel to the spinal column of said pilot, and wherein said actuator means pivots said front panel rearwardly into said shell to allow the pilot's head to move rearwardly between the side panels of said shell.

9. The receding ejection seat headrest of claim 8, further including a support pad mounted on the rear panel of said shell, said support pad aligning the pilot's head and spinal column when the back of the pilot's head rests against said support pad.

10. A receding ejection seat headrest comprising:
a rigid shell mounted on said seat in a position that is adapted to be behind the head of a pilot occupying said seat, said shell having a back panel and a pair of side panels extending forwardly from said back panel, said side panels being spaced apart by a distance that is slightly larger than the width of the pilot's helmet, said side panels including a pair of vertically spaced, longitudinally extending tracks;
a front panel extending between the forward edges of said side panels, said front panel being in a position that is adapted to support the pilot's head at a forwardly titled angle, said front panel further including a pair of vertically spaced coupling members mounted on each of its lateral edges, said coupling members slidably engaging respective tracks to allow said front panel to slide rearwardly into said shell to a position that aligns the pilot's head and spinal column when the pilot's head rests against said front panel; and
actuation means for moving said front panel rearwardly into said shell to allow the pilot's head to move rearwardly between said side panels to an angle at which the pilot's head and spinal column are in alignment with each other.

11. A receding ejection seat headrest comprising:
a rigid shell mounted on said seat in a position that is adapted to be behind the head of a pilot occupying said seat, said shell having a back panel and a pair of side panels extending forwardly from said back panel, said side panels being spaced apart by a distance that is slightly larger than the width of the pilot's helmet;
a front panel extending between the forward edges of said side panels, said front panel being in a position that is adapted to support the pilot's head at a forwardly tilted angle, said front panel being divided into two laterally spaced panel sections, each of which has its outer lateral edge pivotally mounted on a respective side panel; and
actuation means for pivoting said panel sections rearwardly into said shell to allow the pilot's head to move rearwardly between said side panels to an angle at which the pilot's head and spinal column are in alignment with each other.

12. The receding ejection seat headrest of claim 11 wherein said actuator means comprise bias means resiliently biasing said panel sections in a rearward direction, and releasable latching means securing said panel sections in their forward position against the rearward force of said bias means and, when released, allowing said bias means to pivot said panel sections rearwardly into said shell to allow the pilot's head to pivot rearwardly between the side panels of said shell.

13. The receding ejection seat headrest of claim 12 wherein said releasable latching means comprise a pair of latching pins extending from said shell and engaging said panel sections from pivoting rearwardly, and release means for displacing said latching pins so that they disengage respective front panel sections, thereby allowing said front panel sections to pivot rearwardly into said shell.

14. The receding ejection seat headrest of claim 13 wherein said release means includes a solenoid mechanically coupled to said latching pins, so that energization of said solenoid disengages said latching pins from said front panel sections.

15. A method of restraining a pilot's head during ejection from a high-performance aircraft, comprising:
positioning a rigid shell behind the head of the pilot, said shell having a back panel and a pair of side panels extending forwardly from said back panel, said side panels being spaced apart by a distance that is slightly larger than the width of the pilot's head;
supporting the pilot's head in front of said shell during normal flying conditions, said shell being positioned so that the pilot's head is pivoted forwardly out of alignment with the pilot's spinal column; and
allowing the pilot's head to move rearwardly into said shell between said side panels and against said back panel during ejection to align the pilot's head and spinal column and to substantially enclose the pilot's head between said side panels.

16. The method of claim 15 wherein said step of supporting the pilot's head is accomplished by providing a front panel positioned between the forward edges of said side panels, said front panel serving as a headrest for the pilot, and wherein said step of allowing the pilot's head to pivot rearwardly a predetermined distance in the shell is accomplished by moving said front panel rearwardly into said shell between said side panels until the pilot's head has pivoted rearwardly said predetermined distance.

17. A method of restraining a pilot's head during ejection from a high-performance aircraft, comprising:
positioning a rigid shell behind the head of the pilot, said shell having a back panel and a pair of side panels extending forwardly from said back panel, said side panels being spaced apart by a distance that is slightly larger than the width of the pilot's head;
providing a front panel positioned between the forward edges of said side panels, said front panel serving as a headrest for the pilot to support the pilot's head in front of said shell during normal flying conditions, said front panel being positioned so that the pilot's head is pivoted forwardly out of alignment with the pilot's spinal column; and
allowing the pilot's head to pivot rearwardly a predetermined distance into said shell between said side panels during ejection by moving said front panel rearwardly into said shell between said side panels until the pilot's head has pivoted rearwardly in alignment with the pilot's head has pivoted rearwardly in alignment with the pilot's spinal column, the angular orientation of the front panel being maintained constant as said front panel is moved rearwardly into said shell.

18. A method of restraining a pilot's head during ejection from a high-performance aircraft, comprising:
positioning a rigid shell behind the head of the pilot, said shell having a back panel and a pair of side panels extending forwardly from said back panel, said side panels being spaced apart by a distance that is slightly larger than the width of the pilot's head;
supporting the pilot's head in front of said shell during normal flying conditions by providing a front panel extending between the forward edges of said side panels to enclose the volume between said side panels, said front panel being positioned so that the pilot's head is pivoted forwardly out of alignment with the pilot's spinal column; and
allowing the pilot's head to pivot rearwardly a predetermined distance into said shell between said side panels during ejection by removing said front panel from between the front edges of said side panels to provide an opening into the volume between said side panels into which the pilot's head may be inserted, said steps further including the step of supporting the pilot's head in a predetermined position within said shell so that the pilot's head and spinal column are aligned.

19. The method of claim 18 wherein said front panel is removed from between the forward edges of said side panels by dividing said front panel into two panel sections, pivotally mounting each of said panel sections on a respective side panel, and then allowing said panel sections to pivot rearwardly into said shell.

* * * * *